455-613 AU 233 EX
FIP8106 XR 3,927,316 [redacted]

[redacted]

United States P[redacted] ~~T 5005~~ ~~T 5073~~ T 5322Y X 5073T X 5010D

Citta 3,927,316

Dec. 16, 1975

[54] WIRELESS SPEAKER SYSTEM USING INFRA-RED LINK

[75] Inventor: Richard W. Citta, Oak Park, Ill.

[73] Assignee: Zenith Radio Corporation, Chicago, Ill.

[22] Filed: June 7, 1974

[21] Appl. No.: 477,535

[52] U.S. Cl. .................... 250/199; 250/338; 325/46
[51] Int. Cl.$^2$ .............................................. H04B 9/00
[58] Field of Search ........... 250/199, 338, 340, 343, 250/344, 349, 354; 332/7.51; 325/45, 46, 143, 102; 178/DIG. 8; 179/2 E; 340/205

[56] References Cited

UNITED STATES PATENTS

| | | | |
|---|---|---|---|
| 2,032,588 | 3/1936 | Miller, Jr. | 250/199 |
| 2,212,338 | 8/1940 | Bown | 325/46 |
| 2,275,610 | 3/1942 | Bucky et al. | 325/102 |
| 2,699,498 | 1/1955 | Guenther | 325/143 |
| 3,111,587 | 11/1963 | Rocard | 250/199 |
| 3,284,633 | 11/1966 | Hathaway | 250/199 |
| 3,288,930 | 11/1966 | Johnson | 325/46 |

*Primary Examiner*—Benedict V. Safourek
*Assistant Examiner*—Jin F. Ng
*Attorney, Agent, or Firm*—John J. Pederson; Cornelius J. O'Connor

[57] ABSTRACT

An infra-red wireless speaker system utilizing an infra-red wide band FM transmitter and receiver. The infra-red wide band FM transmitter and wide band receiver is used in combination with a conventional audio receiver and speaker system.

10 Claims, 5 Drawing Figures

Wireless Speaker System.

545

Wireless Speaker System.

WIRELESS SPEAKER SYSTEM USING INFRA-RED LINK

SUMMARY OF THE INVENTION

The invention relates to a communication system which is capable of translating an information signal to an information reproducer. The communication system comprises transmitting means having super wide frequency characteristics and having a predetermined center frequency. The transmitting means is capable of translating a frequency modulated signal to receiving means which receive virtually no noise signals above the preselected center frequency of the transmitting means. The receiving means utilizes the frequency modulated signal and couples the modulated signal to the information reproducer.

BACKGROUND OF THE INVENTION

My invention relates to a high performance, wireless communication system utilizing a pulse rate modulated infra-red light source for transmitting an audio signal to remotely placed speaker systems. To date, wireless speaker systems have taken several forms and have been found to be unsatisfactory is design, performance and cost. One method of transmitting an audio signal to a remote speaker requires the use of the electrical wiring system in the dwelling where the wireless audio system is used; another method utilizes narrow band frequencies and ultra-violet light transmission but has an inadequate signal-to-noise ratio and has overall poor performance.

Other classical wireless systems have required elaborate, sophisticated circuitry making the system impractical for consumer products and production line assembly. The disadvantages of these systems are many. The electrical wiring system in a dwelling inherently carries noise from other electrical appliances that is readily detected in the audio speakers causing undesirable noise effects to the listening audience. Other prior art systems utilize radio frequency (RF) radiation. The radiation in these RF systems cannot be contained to one room thereby causing a source of RF interference to other RF devices in the vicinity of the source. As well as being a source of local RF, the prior art systems readily pickup other RF noise from the surrounding area. RF interference also prevents the use of more than one RF device in the area since each would interfere with the other causing undesirable noise effects to be transmitted from the speakers.

The present invention provides a low cost, highly simplified communication system for wireless transmission of audio signals to remotely located sound speaker systems.

OBJECTS OF THE INVENTION

It is a primary object of the invention to produce a high quality, low cost wireless speaker system having a significantly improved signal-to-noise ratio giving full high fidelity performance.

It is a further object of the invention to produce a wireless speaker system that can be easily and readily aligned by the system user.

A further object of the invention is to provide a wireless speaker link readily adaptable to a conventional stereo amplifier, phonograph, television or public address system.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

DESCRIPTION OF THE PREFERRED EMBODIMENT

Figure 1:
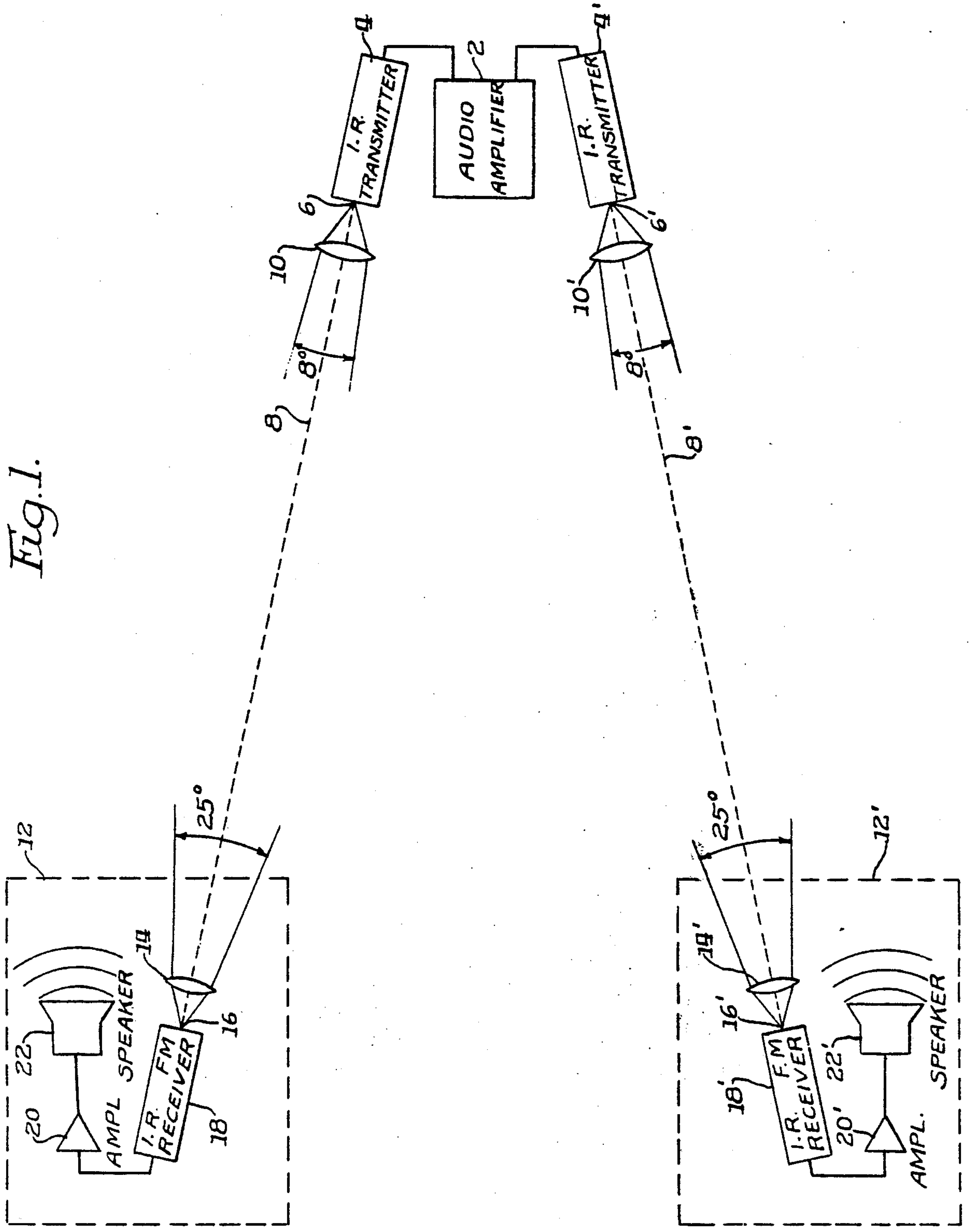
FIG. 1 is a block diagram of a preferred embodiment of the invention comprising a stereo receiver amplifier, infra-red transmitters, infra-red receivers and audio speakers.

FIG. 1 shows a preferred embodiment of the invention. A signal from a conventional audio amplifier stage 2 is transmitted to each of two 4, 4′transmitters 4,4′, each of which activate an infra-red light source 6, 6′. Each light source projects a frequency modulated light beam 8, 8′ through a lens 10, 10′ toward an audio receiver system 12, 12′ which includes a lens 14, 14′ for recovering the projected infra-red signal. The modulated signal is detected by a photodiode 16, 16′ in the receiver 18, 18′ and then demodulated by a pulse counting FM detector and integrating circuit. The output of the demodulating circuit is the reconstituted audio signal which is first amplified by an amplifier 20, 20′ and then used to drive a conventional audio sound speaker 22, 22′.

Figure 2:
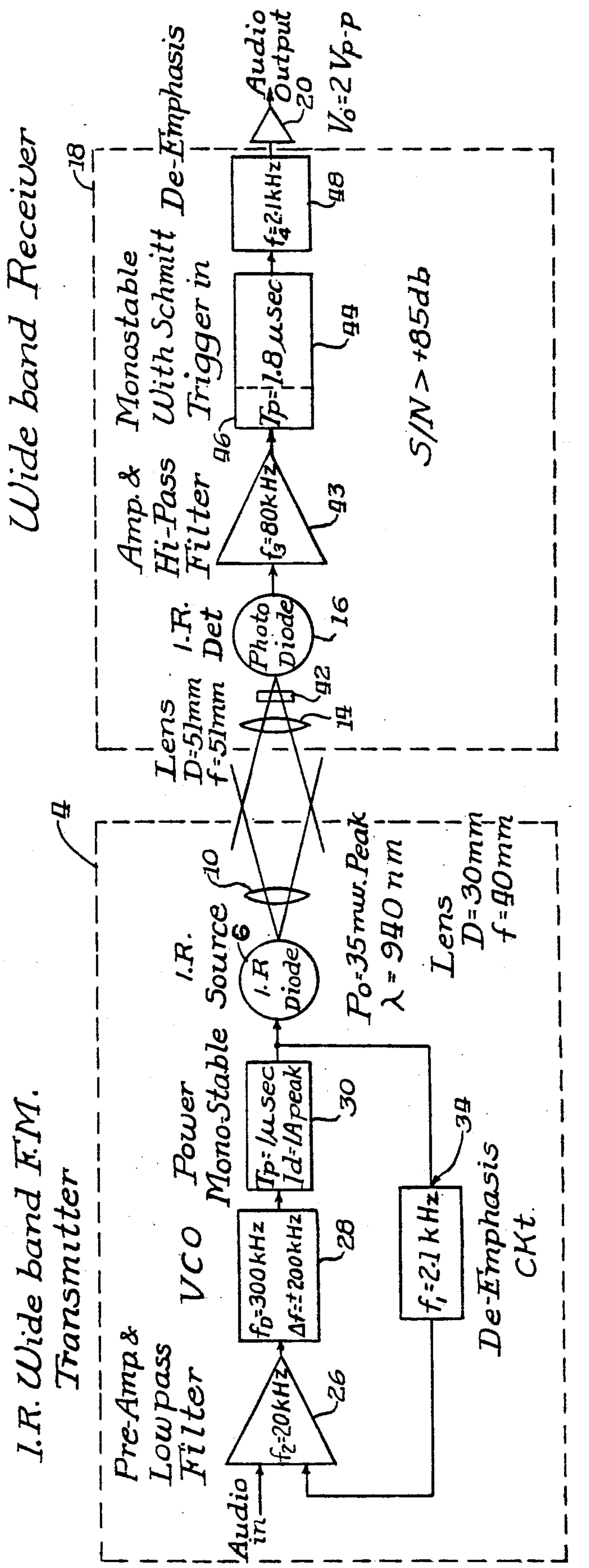
FIG. 2 is an expanded block diagram of certain components of the system of FIG. 1.

The infra-red wide band FM transmitter 4 and receiver 12 are shown in more detail in FIG. 2. The audio signal from the amplifier 2 is applied to a pre-amplifier circuit and low pass filter 26 having a cutoff frequency $f_2$ of 20 kilohertz (kHz). In the preferred embodiment the output from the filter is applied to a voltage controlled oscillator (VCO) 28, preferably having a 300 kHz center frequency $f_D$ and a frequency swing $\Delta f$ of ±200 kHz. The applied signal frequency modulates the oscillator across the 100 to 500 kHz frequency band. With a ± 200 kHz frequency deviation and a 15 kHz audio modulating signal, a minimum modulation index of 13.3 is established and the FM signal-to-noise improvement with de-emphasis is over 40 decibels (db). In classical FM broadcasting systems, the maximum frequency deviation is ± 75 kHz with much higher center frequencies, e.g., 100 megahertz, which gives a minimum modulation index for these previous "wide-band" FM systems of $m_i = 5$.

The output of the VCO in the preferred embodiment is a square wave which drives a power monostable multivibrator 30. The monostable develops output pulses of constant width $T_p$ and height $T_d$, preferably 1 microsecond long and 1 ampere peak. The infra-red diode 6 used in the preferred embodiment is a current responsive device whose output is directly proportional to the amount of current applied to the input of the diode. The diode is also limited as to the amount of power that may be applied to it before it reaches its dissipation limit. To sufficiently drive the diode maintaining a high degree of light emission, it is desirable to pulse the diode with a constant width and height pulse which has proven to give an output of approximately 35 milliwatts peak or 11 milliwatts average with a wave length of approximately 940 nanometers. Pulsing the diode with a constant width and height pulse allows the switching of the diode and the pulsing of the light to be made quickly thereby reducing the amount of power dissipating in the transistor and putting all available power into the diode. The quick switching of the power to the diode makes it possible to put a maximum amount of current into the diode and still not exceed the dissipation limit of the device.

Figure 3:
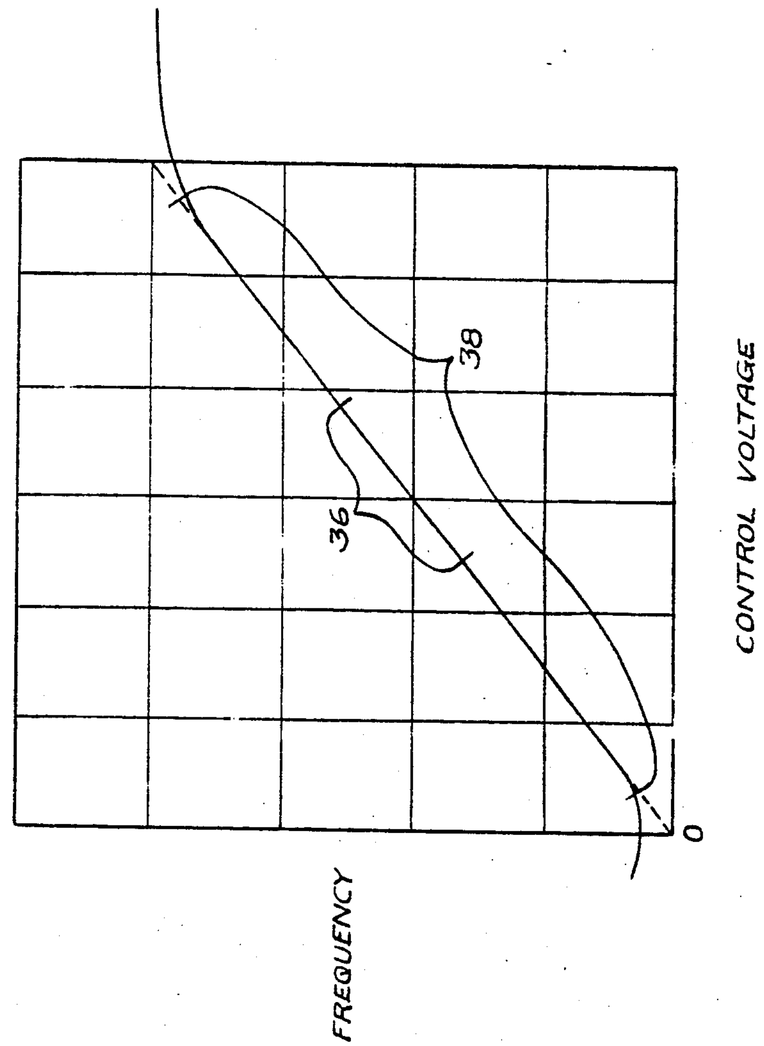
FIG. 3 is a graphical representation of an operating characteristic of the controlled oscillator of FIG. 2.

The preferred embodiment utilizes a negative feedback circuit 34 to stabilize and linearize the frequency vs. voltage characteristics of the oscillator. In a classical FM system a negative feedback loop is not necessary since the frequency swing of a conventional controlled oscillator is along a small linear portion 36 of the oscillator's frequency-voltage operating characteristic, which is typically an S-curve as represented in FIG. 3. In the system of the present invention, the audio signal is reconstituted to provide an out-of-phase signal for a negative feedback loop to stabilize the center frequency of the oscillator, and to linearize the voltage vs. frequency characteristics of the oscillator over a super wide frequency range 38. In stabilizing and linearizing the operation of the oscillator, the distortion in the demodulated FM signal is reduced by 90%. Classically, a negative feedback FM circuit comprises a demodulator and tuned circuits designed to stabilize and linearize the operation of the non-linear device at any given frequency. The obvious method for provising this negative feedback system as displayed in FIG. 2 would have been to design classical negative feedback FM circuitry. However, in accordance with the invention a novel use of the monostable multivibrator is embodied whereby the monostable 30 is utilized as a pulse counting detector for the negative feedback FM circuit 34. The use of the monostable as a detector makes it preferable to use a relatively simple filter to detect the super wide band FM signal across the 400 kHz frequency swing. This use of the monostable provides another unique feature in the circuit design for the negative feedback FM loop. Classically, an FM transmitter has a pre-emphasis circuit placed before the conventional pre-amplifier. In accordance with the invention, the negative feedback FM circuit's filter serves as a de-emphasis circuit having the same effect as the classical pre-emphasis circuit in a conventional FM transmitter. Its rolling off the high frequencies in the negative feedback loop is analogous to the pre-emphasis circuit's enhancement of the high frequency components in a classical FM transmitter system. The cutoff frequency $f_1$ of 2.1 kHz of the low-pass de-emphasis circuit is the same as the 2.1 kHz break point in the classical FM preemphasis circuit.

Pre-emphasis of high frequency components increases the signal-to-noise ratio (S/N) and signal-to-distortional level ($S/D_t$).

In accordance with the invention the negative feedback FM loop linearizes the oscillator's S-curve thus providing for linear modulation of the oscillator by the audio signal, ± 200 kHz about a center frequency of 300 kHz. The only limitation on the frequency deviation is the 1 megahertz upper limit on the oscillator utilized in the preferred embodiment. The center frequency and frequency deviation selected provide a minimum modulation index ($m_f = \Delta f/fm$) of 13.3 and a S/N ratio of approximately 85–90 db to provide high fidelity performance for diverse program content.

It is unique to provide a negative feedback FM loop to linearize the S-curve characteristics of a controlled oscillator. Also unique is the multiple use of the monostable multivibrator as both a pulse counting device in the feedback loop and a power amplifier for the diode drive.

In the preferred embodiment, the pulse rate modulated infra-red signal is projected through a lens 10 having a typical projection angle of approximately 8°, e.g., D=30 millimeters (mm) and $f$=40 millimeters. The receiver's collecting lens 14 has a typical receiving angle of approximately 25°, e.g., D=51 mm and $f$=51 mm. The invention is not restricted to a system wherein the receiving lens has a greater angle and field of view than the projection angle of the transmitter lens. However, in the preferred embodiment the projection lens is more directional, typically on the order of 8° to provide a more collimated and thus intensified beam of light. It is desirable for the lens in the receiving system to have a greater field of view for ease of alignment by simply aiming the transmitter until the receiver intercepts the projected beam and sound is transmitted from the speaker. This is not a system which must be optically aligned, thus allowing for more versatility and usefulness of the system in many various types of surroundings. Use of a different set of lenses having different projection and collecting angles will allow more or less directionality and versatility for the wireless communication system. The preferred embodiment is designed to give high quality fidelity over a span of approximately 30 feet. If high fidility is not required, the system may be adjusted accordingly, allowing use of the wireless communication system for transmission of signals over several hundred feet.

In the preferred embodiment, the size of the receiving lens 14 and the size of the photodiode 16 in combination define the product of the gain and directionality of the infra-red system. With the 25° field-of-view lens 14 in the receiver, a large amount of light is detected by the receiving system 12. Preferably a plastic filter 42 is provided to filter the ambient light and allow only deep reds and infra-red light to pass through the filter onto the infra-red photodiode 16. In a typical room setting, the incandescent and fluorescent lights have portions of their light in the infra-red region. The incandescent light has a large amount of its output energy concentrated in the infra-red region but this energy is modulated at a very low frequency, 120 Hz, allowing it to be attenuated over 120 db as compared to the carrier signal used in the preferred embodiment. Fluorescent light is the greatest source of noise to the infra-red system. A majority of light emitted from a fluorescent bulb is in the UV region and is filtered before reaching the infra-red photodiode 16. However, the fluorescent light in the infra-red region does generate low frequency noise which is filtered by the high pass filter 43 and the FM system.

The photodiode 16 used in the preferred embodiment is a large surface solar cell, having a receiving surface on the order of 1 square centimeter. It is preferable to have the light detector operate in its most linear mode to prevent strong low frequency noise from cross-modulating with the signal. It was found that the photodiode used in the preferred embodiment operated most linearly in its reverse biased current mode. The diode when energized by light develops an electrical signal which is passed through a high pass filter 43. The filter in the preferred embodiment has a cutoff frequency $f_3$ of approximately 80 kHz, allowing only those signals above that frequency to pass to the Schmitt triggered threshold detector 46.

In theory the output from the high pass filter 43 could be integrated to recover the audio signal. However, because of background noise, ambient light noise, imperfections in electrical devices, and the high frequency limitations on the diode and the amplifiers, the integrity of the pulse in the transmitting and receiving process has been severely distorted. It is thus desirable to reconstitute the integrity of the pulse being transmitted from the infra-red diode 6. In the preferred embodiment, a monostable multivibrator 44 reconstitutes the integrity of the pulse. In classical FM systems a limiter is coupled to the system filter to provide noise suppression for received signals. The noise suppression provided by the threshold detector 46 in the preferred embodiment is comparable to that provided by a conventional limiter when the transmitter is transmitting. In addition to suppressing the noise signals present at its input the threshold detector 46 mutes the receiver when the transmitter is not transmitting an information signal. In comparison, a limiter as used in a classical FM system would not mute the receiver when the transmitter is not transmitting. A limiter does not segregate desired signals and noise signals, thus the absence of the transmitted signal causes the limiter to amplify the extraneous noise signal detected by the photodiode 16 just as though it was the desired signal. The amplified noise signal is then transmitted as a high frequency hum or buzz from the sound speaker.

Figure 4A:
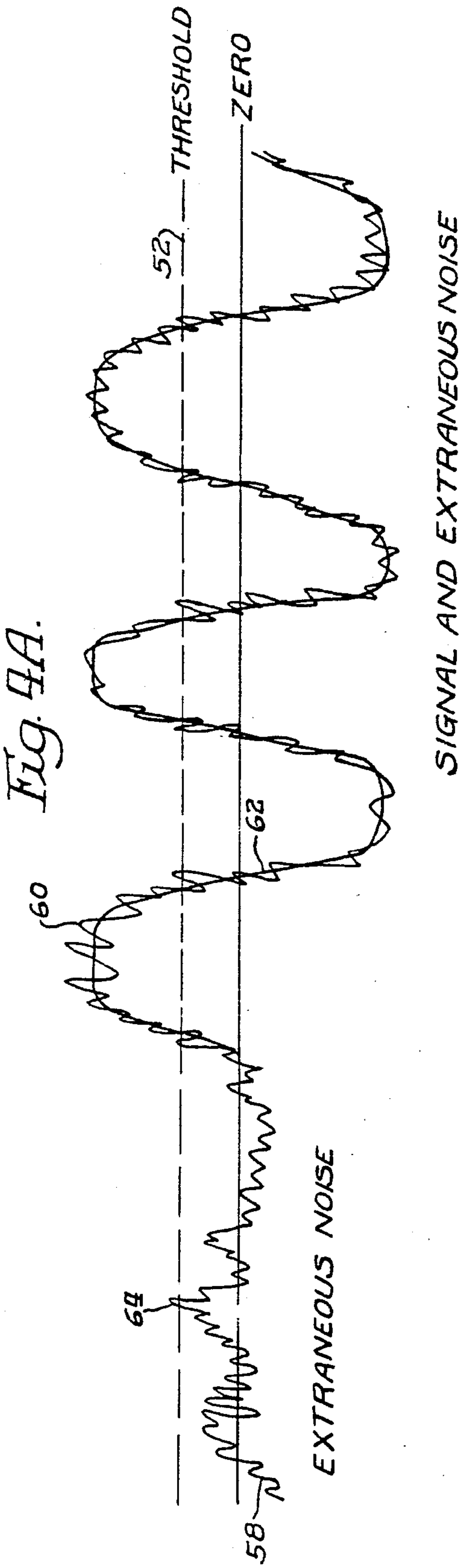
FIG. 4A is an exaggerated graphical representation of the intelligence signal and extraneous noise signal as received by the wide band FM receiver of FIG. 2.

The threshold detector used in the preferred embodiment is a Schmitt trigger input to the monostable multivibrator 44. The threshold level (52 in FIG. 4A) is set so that only a high level signal from the amplifier 43 will trigger the monostable. This threshold level is effectively an off-set zero level, and whenever a signal crosses the threshold the Schmitt trigger switches between two discrete output levels 56, 57. As shown in FIG. 4A the noise signal 58 rides on top 60 the carrier signal 62 detected by the photodiode when the transmitter is transmitting.

When the transmitter is turned off, the desired carrier signal 62 is no longer transmitted and detected by the photodiode. However, the background noise signal 58, for example noise from a fluorescent tube, is still collected by the lens 14. The photodiode is activated and a signal is applied to the remainder of the receiving system just as though it were the desired signal to be transmitted. It has been found that in comparison to the carrier pulses transmitted by the infra-red diode the threshold crossings 64 by the noise signal are infrequent and thus relatively insignificant to the system. Being so infrequent the system will virtually ignore the crossings 64 and no noise will be transmitted from the audio speakers. This effectively acts as a muting device for the receiver.

When the transmitter is transmitting a signal 62, the Schmitt trigger will change levels 56, 57 each time the composite noise and carrier signal crosses the threshold 52. The effect of the noise 58 produces uncertainty in the exact timing of the leading and lagging edges of the pulses 68 from the Schmitt trigger.

Figure 4B:
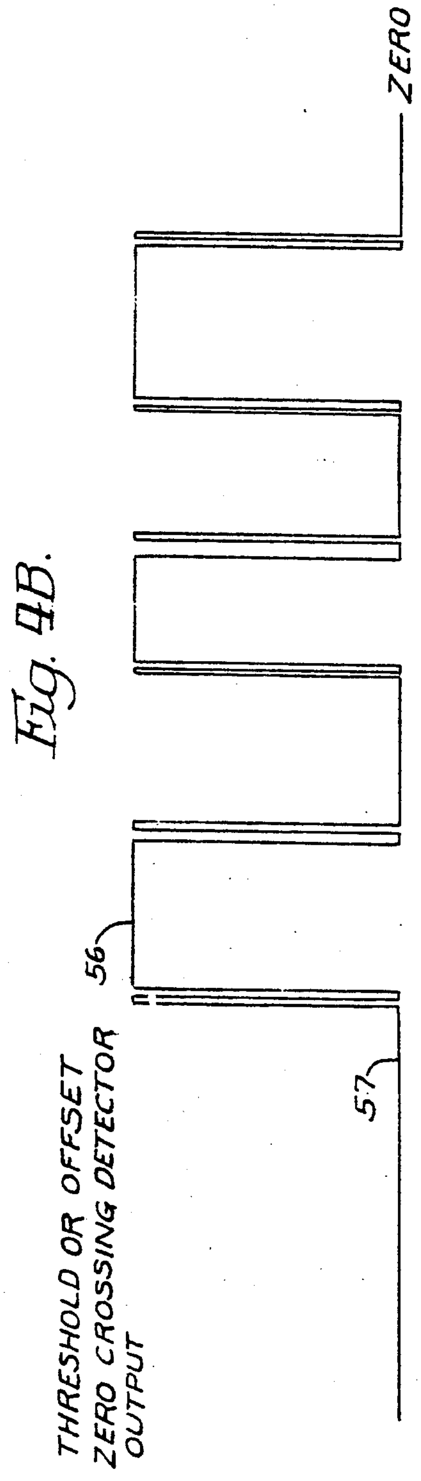
FIG. 4B is a graphical representation of the intelligence signal as reconstituted by the Schmitt trigger threshold detector of FIG. 2.

The output from the threshold or off-set zero crossing detector as displayed in FIG. 4B is applied to the monostable multivibrator 44 which reconstitutes the integrity of the pulse rate modulated signal projected by the infra-red diode 6. The monostable produces a constant width and constant height pulse for each positive going pulse recognized by the threshold detector. The design of the monostable is such that one pulse is completed before a second pulse is initiated. To assure an accurate representation of the existing infra-red diode pulse train, it is desiragle to have the width of the reconstituted pulse greater than the width of the carrier signal pulses and less than 2 microseconds in duration to allow detection of the 500 kHz signals. The effect of the narrow width noise pulses in FIG. 4B on the constant width pulses developed by the monostable is negligible. It merely appears as though the monostable pulse begins slightly earlier or later than normal. These variations in timing have no effect on the constant width of the monostable pulse. When the monostable pulse train is integrated, minute variations of starting times will average to virtually zero over a period of time.

The integrator circuit includes a de-emphasis circuit (48 in FIG. 2) to roll-off noise signals above a cutoff frequency $f_4$ of 2.1 KHz. The output voltage from the de-emphasis circuit 48 is directly proportional to the instantaneous frequency of the carrier signal which is directly proportional to the amplitude of the original audio signal. The integrated signal is therefore a replica of the original audio signal; it has a high level output $V_0$ of approximately 2 volts peak-to-peak, needing only power amplification prior to being transmitted from the sound speakers. The system operates linearly over a wide range with no critical components and with very low distortion.

The invention as disclosed in the preferred embodiment providess a high quality, low cost wireless speaker system having a variety of uses in the transmission of audio signals. A significantly improved signal-to-noise ratio giving high fidelity performance is accomplished by the incorporation of the invention in the preferred embodiment. The invention further provides the user of the wireless speaker system with a system that can be quickly and easily aligned and still produce high fidelity sound from the speaker system. The invention is readily adaptable to conventional stereo amplifier systems, phonographs, televisions or public address systems. This adaptability allows more versatility in systems utilizing speakers or information reproducers where a wireless link is advantageous. The objectives of the invention have been accomplished.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A communication system for developing and translating an information signal to an information reproducer, said system comprising:

a transmitter comprising an oscillator, for developing a carrier signal of a predetermined center frequency, means for coupling said information signal to said oscillator for frequency modulating said carrier signal in accordance with said information signal to deviate said carrier over a super wide band of frequencies such that the peak deviation of the carrier is of the same order of magnitude as the frequency of the carrier itself and the modulation index of said transmitter is substantially greater than the modulation index of a standard FM broadcasting service, means responsive to the modulated output of said oscillator for generating a train of pulses of substantially constant width and height, a light source, responsive to said train of pulses, for producing and transmitting a modulated beam of light energy, and a negative feedback system coupled between the output of said pulse generating means and the input of said oscillator, said feedback system comprising a de-emphasis network for stabilizing the center frequency of the oscillator and for linearizing the voltage v. frequency characteristic of the oscillator over said super wide range of frequency deviation;

receiver means comprising a photodetector responsive to said modulated beam of light energy for deriving an electrical signal, means responsive to said electrical signal for reconstituting a replica of said original train of pulses, demodulation means responsive to said reconstituted train of pulses for deriving said information signal therefrom, and means for applying said information signal to said information reproducer.

2. A communication system as set forth in claim 1 in which said means for generating said train of pulses comprises a monostable multivibrator that, in addition to driving said light source, also serves as a pulse counting detector for energizing said negative feedback system.

3. A communication system as set forth in claim 1 in which said de-emphasis network comprises a low pass filter for intergrating the output of said pulse generating means and applying that integrated signal to the input of said oscillator.

4. A communication system as set forth in claim 1 which further includes a narrow-angle projection lens for directing said modulated beam of light energy and a wide-angle receiving lens for capturing said modulated beam of light energy.

5. A communication system as set forth in claim 1 which further includes a high pass filter interposed between said photodetector and said means for reconstituting said replica of said pulse train for attenuating noise signals emanating from incandescent and flourescent fixtures without phase distorting said electrical signal derived by said photodetector.

6. A communication as set forth in claim 1 in which said demodulation means comprises an integrating circuit, including a de-emphasis network, for deriving said information signal.

7. A communication system as set forth in claim 1 in which said light source comprises an infra-red light emitter.

8. A communication system as set forth in claim 7 in which said photodetector comprises a device sensitive to infra-red radiation.

9. A communication system as set forth in claim 1 in which said means for reconstituting said replica of said train of pulses comprises a zero crossing detector for processing the desired portions of said electrical signal derived by said photodetector and for suppressing extraneous noise signals when said transmitter is in a non-transmitting mode and, further comprises a pulse counting detector responsive to said zero crossing detector for developing constant width and constant height pulses for each positive going pulse recognized by said zero crossing detector.

10. A communication as set forth in claim 9 in which said zero crossing detector comprises a Schmitt trigger circuit and said pulse counting detector comprises a monostable multivibrator.

* * * * *